(12) United States Patent
Ghiron et al.

(10) Patent No.: US 7,003,196 B2
(45) Date of Patent: Feb. 21, 2006

(54) EXTERNAL GRATING STRUCTURES FOR INTERFACING WAVELENGTH-DIVISION-MULTIPLEXED OPTICAL SOURCES WITH THIN OPTICAL WAVEGUIDES

(75) Inventors: Margaret Ghiron, Allentown, PA (US); Prakash Gothoskar, Allentown, PA (US); Robert Keith Montgomery, Easton, PA (US); Vipulkumar Patel, Monmouth Junction, NJ (US); Soham Pathak, Allentown, PA (US); Kalpendu Shastri, Orefield, PA (US); Katherine A. Yanushefski, Zionsville, PA (US)

(73) Assignee: SiOptical, Inc., Allentown, PA (US)

( * ) Notice: Subject to any disclaimer, the term of this patent is extended or adjusted under 35 U.S.C. 154(b) by 0 days.

(21) Appl. No.: 10/935,145

(22) Filed: Sep. 7, 2004

(65) Prior Publication Data
US 2005/0094938 A1  May 5, 2005

Related U.S. Application Data

(60) Provisional application No. 60/500,185, filed on Sep. 4, 2003.

(51) Int. Cl.
*G02B 6/34* (2006.01)

(52) U.S. Cl. .......................... 385/36; 385/37
(58) Field of Classification Search ............... 385/24, 385/31, 36, 37, 129, 130, 30, 13
See application file for complete search history.

(56) References Cited

U.S. PATENT DOCUMENTS

| | | | |
|---|---|---|---|
| 3,883,221 A | | 5/1975 | Rigrod |
| 4,343,532 A | * | 8/1982 | Palmer .......................... 385/36 |
| 4,877,301 A | * | 10/1989 | Yokomori et al. ............. 385/37 |
| 5,101,458 A | * | 3/1992 | Spaulding et al. ............. 385/36 |
| 6,449,066 B1 | * | 9/2002 | Arns et al. ..................... 359/15 |

OTHER PUBLICATIONS

L.A. Coldren, Y.A. Akulova, E.M. Strazelecka, B.J. Thibeault, J.C. Ko and D.A. Louderback, "VCSEL Array Packaging for Free Space Interconnects" University of California, Report 1996-1997 for MICRO Project 96-050.

R. Ulrich, "Optimum Excitation of Optical Surface Waves" Journal of the Optical Society of America, vol. 61, No. 11, Nov. 1971.

Hiroshi Nishihara, Masamitsu Haruna, Toshiaki Suhara, "Optical Integrated Circuits", 1985.

P.K. Thien, R. Ulrich, "Theory of Prism-Film Coupler and Thin-Film Light Guides" Journal of the Optical Society of America, vol. 60, No. 10, Oct. 1970.

* cited by examiner

*Primary Examiner*—Sarah Song
(74) *Attorney, Agent, or Firm*—Wendy W. Koba

(57) ABSTRACT

A coupling arrangement for allowing multiple wavelengths to be coupled into and out of a relatively thin silicon optical waveguide layer utilizes a diffractive optical element, in the form of a volume phase grating, in combination with a prism coupling structure. The diffractive optical element is formed to comprise a predetermined modulation index sufficient to diffract the various wavelengths through angles associated with improving the coupling efficiency of each wavelength into the silicon waveguide. The diffractive optical element may be formed as a separate element, or formed as an integral part of the coupling facet of the prism coupler.

12 Claims, 7 Drawing Sheets

EXTERNAL GRATING STRUCTURES FOR INTERFACING WAVELENGTH-DIVISION-MULTIPLEXED OPTICAL SOURCES WITH THIN OPTICAL WAVEGUIDES

CROSS-REFERENCE TO RELATED APPLICATION

The present application claims the priority of Provisional Application No. 60/500,185 filed Sep. 4, 2003.

TECHNICAL FIELD

The present invention relates to an arrangement for providing coupling of a multiple wavelength external optical source into a relatively thin silicon waveguide and, more particularly, to the use of an external volume phase grating integral with an input facet of a coupling prism to provide efficient optical coupling over an extended wavelength range.

DESCRIPTION OF THE PRIOR ART

To meet the bandwidth requirements of current and future high speed communication applications, state-of-the-art telecommunication components and systems must provide a host of sophisticated signal processing and routing functions, in both the optical and electronic domains. As the complexity level increases, the integration of more functions and components within a single package becomes required to meet various system-level requirements and reduce the associated size and cost of the complete system. It has been recognized for some time that the integrated circuit devices, processes and techniques that revolutionized the electronics industry can be adapted to produce optoelectronic integrated circuits. In typical optoelectronic integrated circuits, light propagates through waveguides of high refractive index materials such as silicon, gallium arsenide, indium phosphide or lithium niobate. The use of these high index materials enables smaller device sizes, since a higher degree of mode confinement and smaller bend radii may be realized. While all transmitter, signal processing and receiver functions may be incorporated in a single optoelectronic integrated circuit, the system may alternatively be constructed from a number of smaller packaged elements, referred to as "hybrid optoelectronic integration" or, alternatively, "multi-module optoelectronic integration".

To enable many of the applications required for current and planned telecommunication systems, it is necessary to consider the performance behavior of optical components, such as waveguides, when different wavelength signals are launched along the waveguide. For fiber-based telecommunications systems, standard single mode fiber supports low loss transmission over the wavelength range of approximately 1260 nm (defined as the lower wavelength bound for single mode transmission) to 1625 nm (defined as the upper wavelength limit for which intrinsic scattering mechanisms lead to acceptable loss). For one class of applications defined as "dense wavelength division multiplexing" (DWDM), the wavelengths of interest are spaced by intervals of 0.1, 0.2, 0.4, 0.8 or 1.6 nm (i.e., 12.5, 25, 50, 100 and 200 GHz, respectively) in a band delimited by a minimum wavelength ($\lambda_{min}$) and a maximum wavelength ($\lambda_{max}$). As an example, DWDM systems can support 16 channels (for a 200 GHz system) and as many as 80 channels (for a 50 GHz system) within the C-band (conventional band) wavelength range of 1530–1565 nm. Other bands that are frequently considered for DWDM systems in telecommunications include the S-band (short wavelength band) from 1460–1530 nm, and the L-band (long wavelength band) from 1565–1625 nm. For a second class of applications known as coarse wavelength-division-multiplexing (CWDM), the International Telecommunications Union standard (G.942.2) defines the CWDM wavelength grid as consisting of 18 wavelengths, with 20 nm spacing between adjacent wavelengths, covering the wavelength range from 1270–1610 nm. As an example, a CWDM system might operate in an 8-channel configuration that spans a wavelength range from 1470 nm–1610 nm. Practically speaking, a CWDM system can utilize as many as 17 or 18 channels over a larger wavelength range of 1270 nm–1610 nm.

A relatively new field of optics is based on the use of silicon as the integration platform, forming the necessary optical and electrical components on a common silicon substrate. The ability to couple an optical signal into and out of a silicon waveguide layer (particularly, to a sub-micron thick silicon surface waveguide layer) is a problem that is the subject of current research, as discussed in our co-pending applications Ser. Nos. 10/668,947 and 10/720,372 on the subject of prism coupling and herein incorporated by reference. The coupling problem becomes exacerbated in the above-referenced DWDM and CWDM systems, since the coupling must be relatively wavelength insensitive, providing adequate coupling power over the entire wavelength range of interest.

SUMMARY OF THE INVENTION

The need remaining in the prior art is addressed by the present invention, which relates to an arrangement for providing coupling of a multiple wavelength external optical source into a relatively thin silicon waveguide and, more particularly, to the use of an external volume phase grating proximate to, or integral with, an input facet of a coupling prism to provide efficient optical coupling over an extended wavelength range.

In accordance with the present invention, at least one volume phase grating is disposed proximate to the input facet of a coupling prism so as to diffract each different, incoming optical signal wavelength through a different angle as it passes through the coupling prism. By careful choice of the grating characteristics, a structure can be formed that disperses the various input angles so as to allow for each wavelength to be efficiently coupled into a thin silicon waveguide layer.

In systems utilizing DWDM, a single volume phase grating may be used, while in arrangements utilizing CWDM a plurality of different gratings, disposed at different angles, may be required to cover the complete wavelength range of interest.

It is an advantage of the present invention that wafer-scale processing techniques can be used to form the desired grating structure(s), and in one embodiment the grating may be directly formed on the input facet of a coupling prism. Alternatively, the grating may comprise a separate element and be located at a pre-defined spacing and angular displacement with respect to the input facet of the coupling prism.

These and other aspects and advantages of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
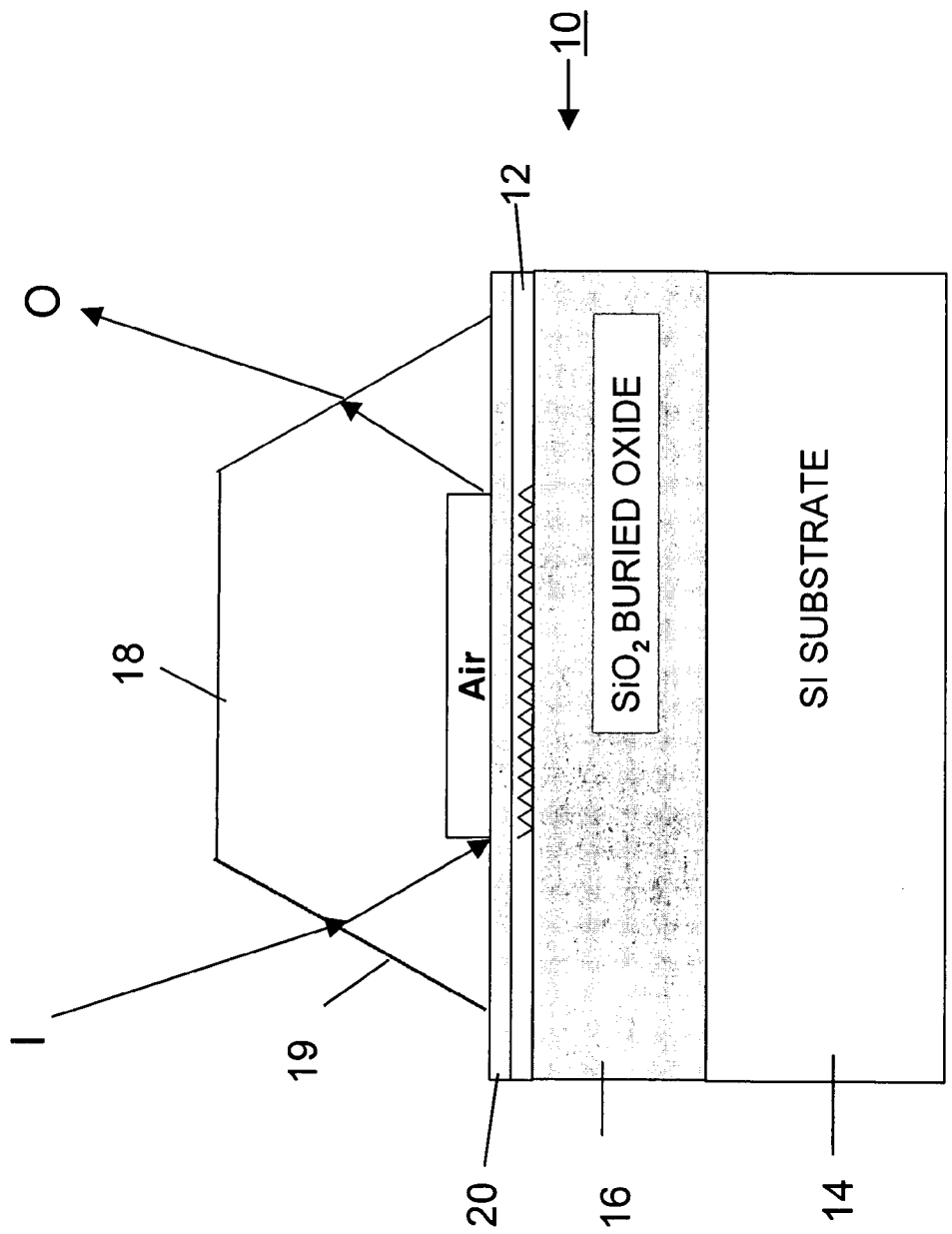
FIG. 1 contains an exemplary arrangement of providing prism coupling into and out of a relatively thin, planar silicon optical waveguide.

An exemplary arrangement utilizing prism coupling to bring light into and out of a relatively thin silicon waveguide is illustrated in FIG. 1. In this particular example, an SOI wafer 10 includes a relatively thin (sub-micron) silicon waveguide layer 12 that is separated from a silicon substrate 14 by a buried oxide layer 16. A prism coupling device 18 is utilized to couple an external lightwave beam I into silicon waveguide layer 12, as shown. An evanescent coupling layer 20, disposed between silicon waveguide layer 12 and prism coupling device 18 is used to affect the coupling between the components. As discussed in our co-pending applications, the refractive index of evanescent coupling layer 20 is selected to be less than the indexes of the prism and silicon waveguide so that efficient guiding within waveguide layer 12 is achieved and maintained. Both prism coupling device 18 and SOI wafer 10 are fabricated using conventional wafer-level semiconductor processing techniques. The material that forms evanescent coupling layer 20 may be deposited on either component, with the two joined using appropriate wafer-to-wafer bonding techniques.

Figure 2:
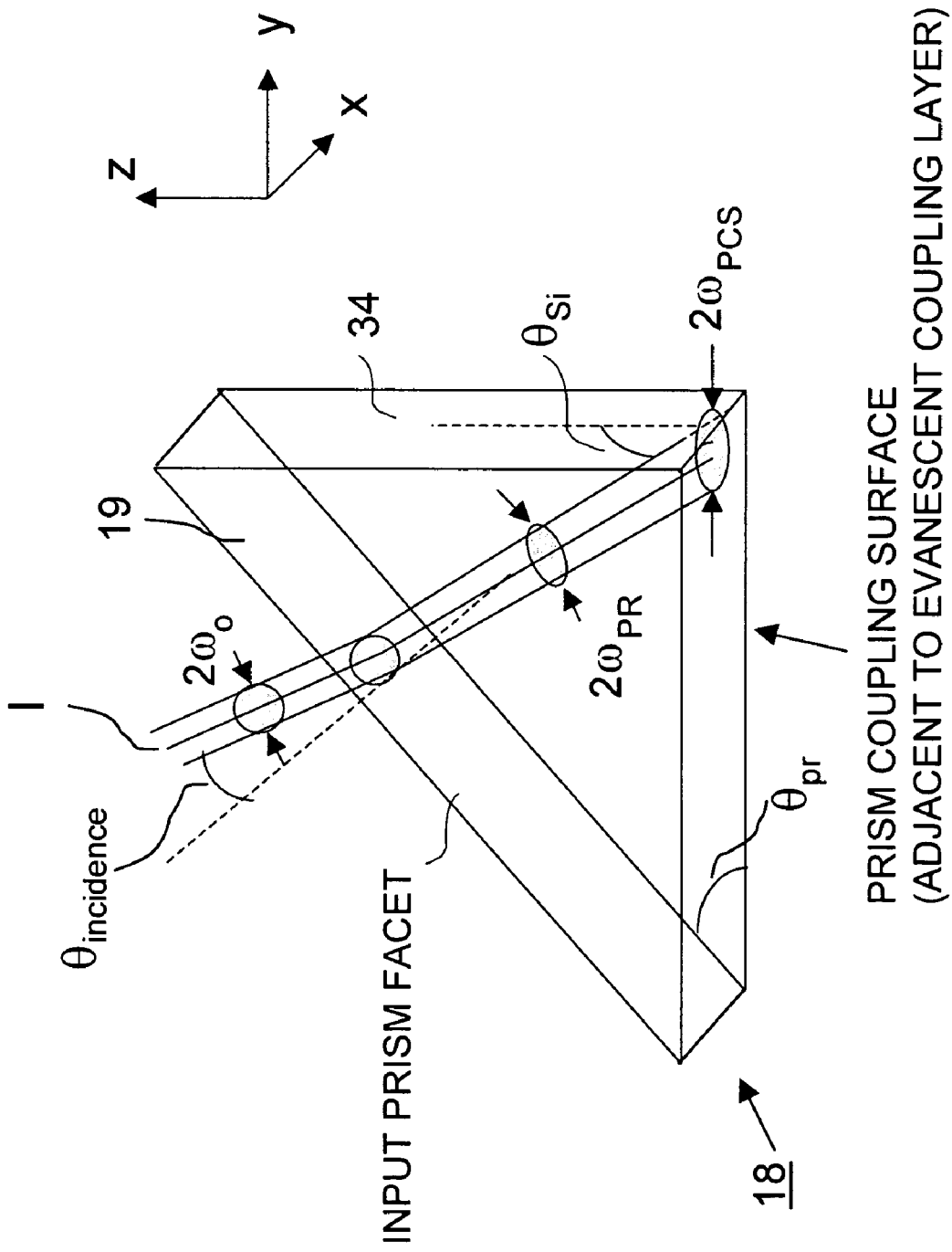
FIG. 2 is an idealized diagram of a prism coupler, useful in understanding the optics associated with prism coupling.

FIG. 2 is an idealized diagram of prism coupler 18 that is useful in understanding the optics associated with prism coupling in accordance with the present invention. As shown, the input beam must be launched at an angle of incidence that is determined by the wavelength and polarization state of the light signal, the refractive indexes and thicknesses of silicon waveguide layer 12 and evanescent coupling layer 20, as well as the refractive indexes of buried oxide layer 16, prism coupler 18 and the surrounding medium (typically "air"). As illustrated in FIG. 2, there are two relevant angles: (1) $\theta_{Si}$, the beam angle in the prism relative to the normal of the SOI wafer plane; and (2) $\theta_{incidence}$, the angle of incidence on prism input coupling facet 19 (as measured from the normal to facet 19). The value of $\theta_{Si}$ is determined by the wavelength and polarization state of the incoming light, the refractive indexes and thicknesses of silicon waveguide layer 12 and evanescent coupling layer 20, and the refractive index of buried oxide layer 16 and prism coupler 18. The value for $\theta_{incidence}$ is then determined by applying Snell's law at the prism/air interface to transform $\theta_{Si}$ into $\theta_{incidence}$.

Figure 3:
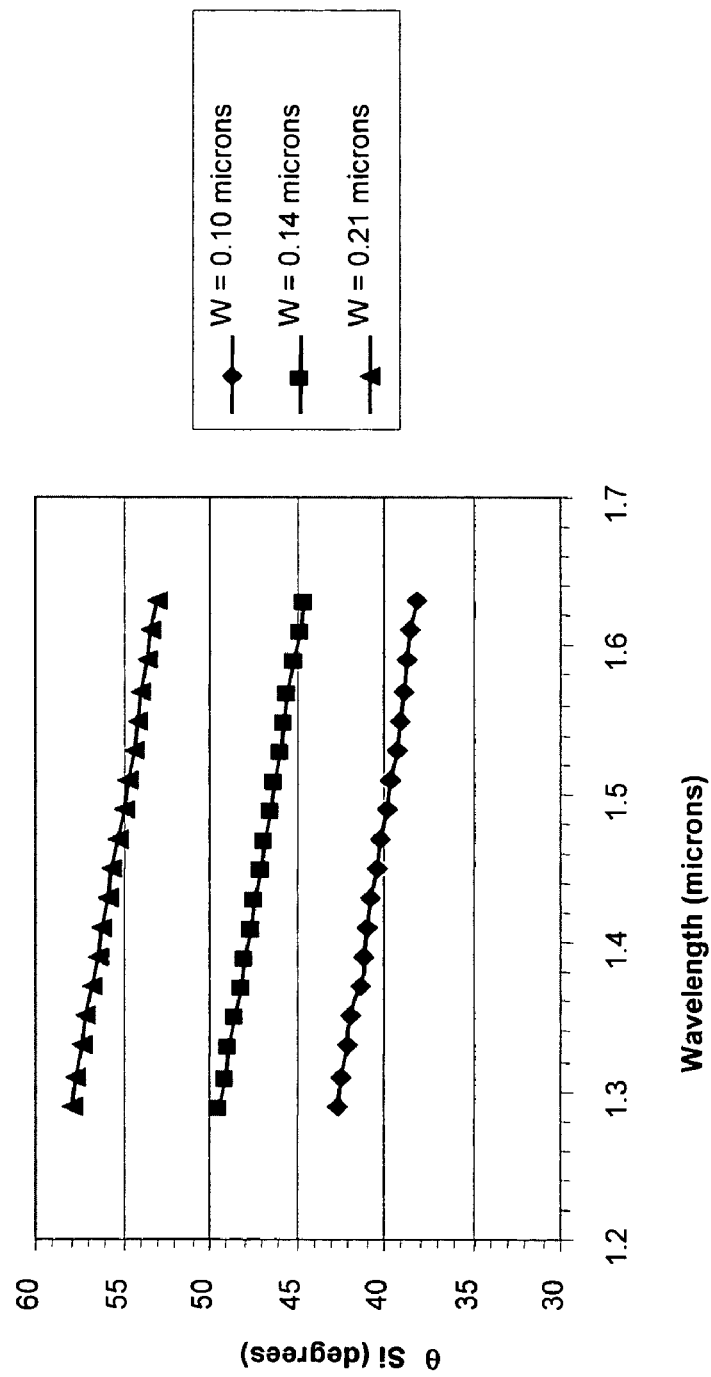
FIG. 3 contains a graph illustrating the optimum values of $\theta_{Si}$ as a function of wavelength (for three different waveguide thicknesses)

Since the present invention is directed to providing coupling over a range of different wavelengths (the phrase "different wavelengths" is considered as also including the range of wavelengths associated with a single wavelength source, since a "single wavelength" source will be subject to variation as a function of various environmental and aging factors), the wavelength-dependent properties of prism coupling need to be explored and understood. FIG. 3 contains a graph illustrating the optimum values of $\theta_{Si}$ as a function of wavelength, for three different thicknesses of waveguide layer 12. This data illustrates that it is reasonable to approximate $\theta_{Si}$ as a linear function of wavelength over a fairly broad range of wavelengths (at least over the wavelength range of interest to optical communication systems—1.3–1.6 $\mu$m). Indeed, the linear relation between $\theta_{Si}$ and wavelength can be expressed as follows:

$$\theta_{Si}(W,\lambda) = \theta_{Si}(W,\lambda_c) + c(W)*(\lambda - \lambda_c),$$

where W is defined as the thickness of the waveguide layer, $\lambda_c$ is the center wavelength within the range, and c is the slope of the curve, having values for the exemplary embodiment of FIG. 3 of approximately $-0.0144°$/nm for W=0.14 $\mu$m and 0.21 $\mu$m, and approximately $-0.0129°$/nm for W=0.10 $\mu$m. It follows that if a system is aligned for operation at the center wavelength $\lambda_c$, then the coupling will be maximized for $\theta_{Si}(W,\lambda_c)$. The coupling efficiency for other wavelengths $\lambda$ in the vicinity of $\lambda_c$ will then depend on the width of the coupling curve as a function of wavelength. If the coupling efficiency is denoted by $\eta$, then it can be shown that for an evanescent layer of constant thickness and refractive index the coupling efficiency as a function of wavelength can be defined as follows:

$$\eta(\lambda) = \frac{\eta_{\max}(\alpha\omega_{PCS})}{1 + \frac{4\pi^2 n_{Si}^2 \omega_{PCS}^2}{(\alpha\omega_{PCS})^2} \frac{\{\sin[\theta_{Si}(\lambda_c) + c(\lambda - \lambda_c)] - \sin[\theta_{Si}(\lambda_c)]\}^2}{\lambda^2}},$$

where $\omega_{PCS}$ is the radius of the input beam at the prism coupling surface (see FIG. 2), $\alpha$ is defined as the leakage parameter, $\alpha\omega_{PCS}$ is the parameter that sets the coupling efficiency for an evanescent coupling layer of constant thickness and refractive index, and $n_{Si}$ is the refractive index of silicon (having a value of approximately 3.5 for the wavelength range of interest).

From this relation for coupling efficiency $\eta(\lambda)$, it can be seen that a principal source of wavelength sensitivity is the wavelength dependence of the angle $\theta_{Si}$, and that the coupling efficiency can be maximized by minimizing the value of the expression $\{\sin[\theta_{Si}(\lambda_c) + c(\lambda - \lambda_c)] - \sin[\theta_{Si}(\lambda_c)]\}$. In one approach, is maintained over a wavelength band of interest by selecting a design characterized by a small value of "c", the slope of the curve as shown in FIG. 3. Indeed, it can be shown that the slope $c=\Delta\theta_{Si}/\Delta\lambda$ tends to decrease in magnitude as the device layer thickness is decreased and the refractive index of the coupling layer is increased. For example, for one exemplary embodiment, it can be shown that for $c \approx -0.0144°$/nm, $\omega_{PCS} \approx 45.0$ $\mu$m, and an evanescent coupling layer having a thickness profile chosen to optimize optical coupling (via the leakage parameter $\alpha$), a signal with a 40 nm bandwidth will have a peak transmission of approximately 94% at the central wavelength, with a 3 dB loss at ±20 nm. While this configuration can permit efficient optical coupling of DWDM signals, or a very limited number of CWDM channels, such a configuration is not preferred for efficient transmission of several widely-spaced CWDM channels. To further increase the device bandwidth, an alternative embodiment of the present invention utilizes a construct that modifies the direction of propagation of a signal as a function of wavelength, so that $\theta_{Si}$ is optimized for each wavelength. In the above expression for $\eta(\lambda)$, this is equivalent to the difference between the wavelength $\lambda$ and the center wavelength value $\lambda_c$ approaching zero.

Figure 4:
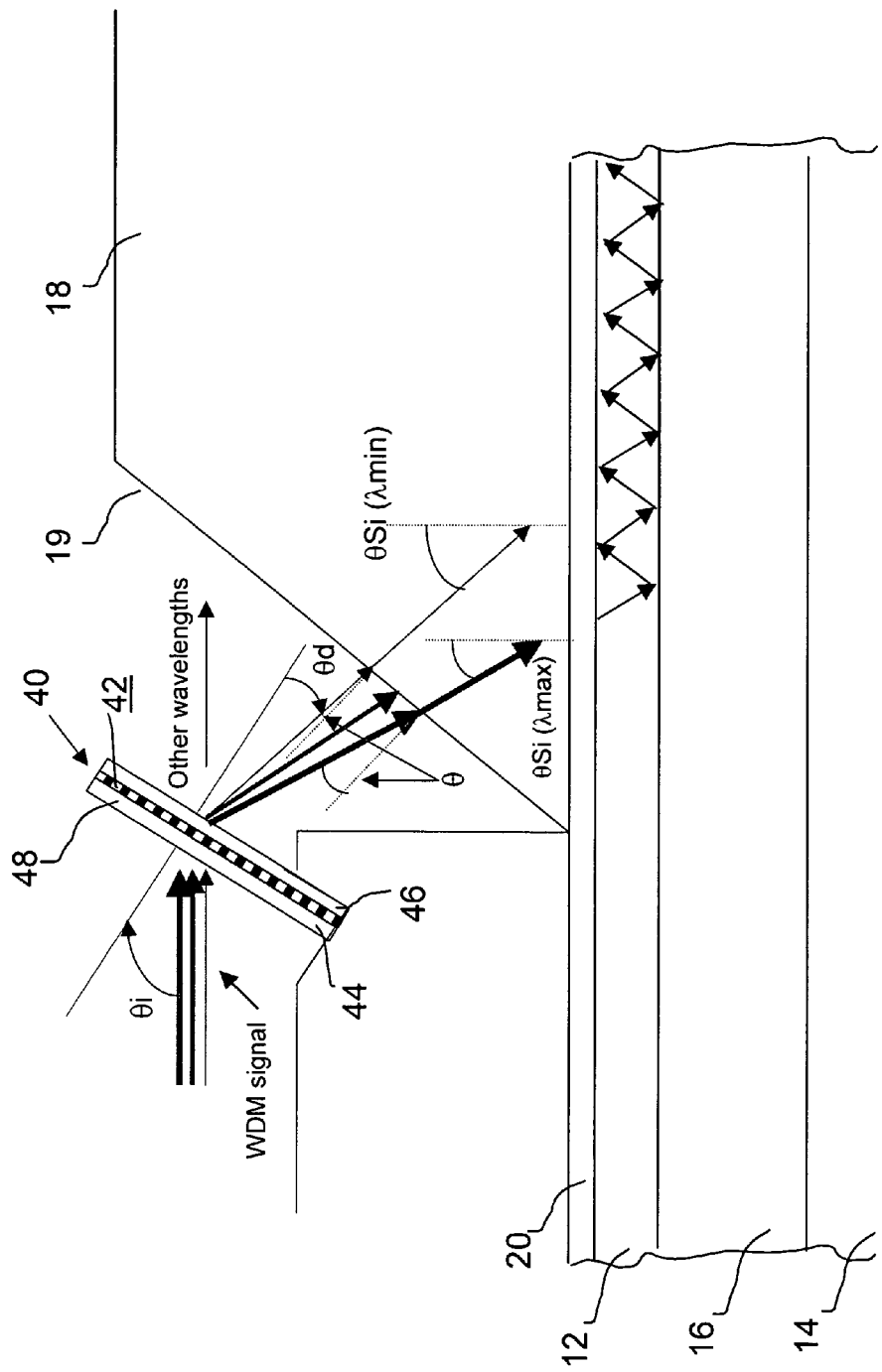
FIG. 4 contains a diagram of an exemplary embodiment of the present invention, utilizing a volume phase grating to provide multiple wavelength coupling between a prism coupler and a planar surface waveguide.

FIG. 4 illustrates an exemplary arrangement 40 that utilizes a volume phase grating 42 to provide multiple wavelength coupling in accordance with the present invention. As mentioned above, volume phase grating 42 causes different wavelengths in the input beam (for the sake of discussion, illustrated with arrows of three different linewidths) to be output from grating 42 at different launch angles. The key element of volume phase grating 42 is a layer of photosensitive material 44 that is processed to produce a periodic modulation of the refractive index of grating 42. Typically, the refractive index modulation is produced by recording an interference pattern within the volume of photosensitive material 44, where the difference in refractive index ($\Delta n$) may be as large as 0.1. Typical grating thicknesses range from a few $\mu$m to over one hundred $\mu$m, and the aperture of the grating can range from approximately one millimeter to over 500 mm. Referring to FIG. 4, photosensitive layer 44 is shown as being encapsulated between two layers of substrate material 46 and 48, where layers 46 and 48 can be anti-reflection coated to improve transmission efficiency. The completed grating assembly can thereafter be diced into individual chips, if necessary.

In the arrangement as illustrated in FIG. 4, grating 42 is shown as disposed at an angle ($\theta_d$–$\theta$), as defined in FIG. 2, with respect to input coupling facet 19 of prism coupler 18. This angle can be adjusted to ensure that the diffracted beams enter the prism coupling facet 19 at the correct $\theta_{incidence}$ angles. Alternatively, grating layer 44 can be disposed at an angle with respect to layers 46 and 48, allowing for a more conventional positioning and attachment of grating element 42 to the remaining input coupling elements. Accordingly, grating element 42 of the present invention provides both the desired diffraction and beam steering capabilities.

While volume phase gratings obey the classical diffraction equation, photosensitive layer 44 is sufficiently thick such that the diffraction efficiency for the various diffraction orders is governed by Bragg diffraction. It can be shown that for a grating in a thick layer, diffraction occurs only in the first order for a range of wavelengths that satisfy, or nearly satisfy, the first order Bragg condition:

$$\lambda = 2\Lambda \sin \theta_{vpg},$$

in which $\Lambda$ is the period of the grating and $\theta_{vpg}$ is the angle of incidence of the light beam on volume phase grating 42, defined with respect to the normal of the element. For wavelengths that are far from meeting the first-order Bragg condition, diffraction will only occur in the zeroth order, meaning that wavelengths outside of the grating bandwidth are directly transmitted through volume phase grating 42.

Thus, in accordance with the present invention, volume phase grating 42 provides high diffraction efficiency (approximately 94%) in a single diffraction order, producing large deflection angles that are substantially insensitive to the polarization state of the input beam. If the refractive index modulation $\Delta n$ is sufficiently large, the bandwidth of the volume phase grating can accommodate CWDM signals, for which each channel passband is on the order of several nm.

In the proper configuration of a volume phase grating used with a prism coupler to provide high coupling efficiency over a broad range of wavelengths, it is necessary to consider the sign and magnitude of the dispersion (i.e., the angular dependence of the diffracted beam) of the volume phase grating. In particular, the dispersion must be sufficient to produce the correct wavelength variation of mode angle in the prism/waveguide assembly. Further, the diffraction efficiency of the volume phase grating must be sufficiently high over each of the wavelength sub-bands of interest. Lastly, since each wavelength will intercept evanescent coupling layer 20 at a different point, the coupling efficiency will still vary as a function of wavelength. As shown below, the dispersion of a volume phase grating used in accordance with the present invention should be set equal to the desired dispersion $\Delta\theta_{incidence}/\Delta\lambda$ by setting the period of the grating and the diffraction angle $\theta_d$. Referring to FIG. 4, the dispersion of grating 42 (that is, the variation of $\theta_d$ with wavelength) is illustrated as greatly exaggerated for the sake of clarity. Since volume phase grating 42 exhibits negative dispersion, the longer wavelengths are diffracted through larger angles of $\theta_d$ than the shorter wavelengths. Through the application of Snell's law, therefore, $\theta_{Si}$ will decrease as the wavelength increases (precisely the desired dependence as discussed above in association with FIG. 3).

Figure 5:
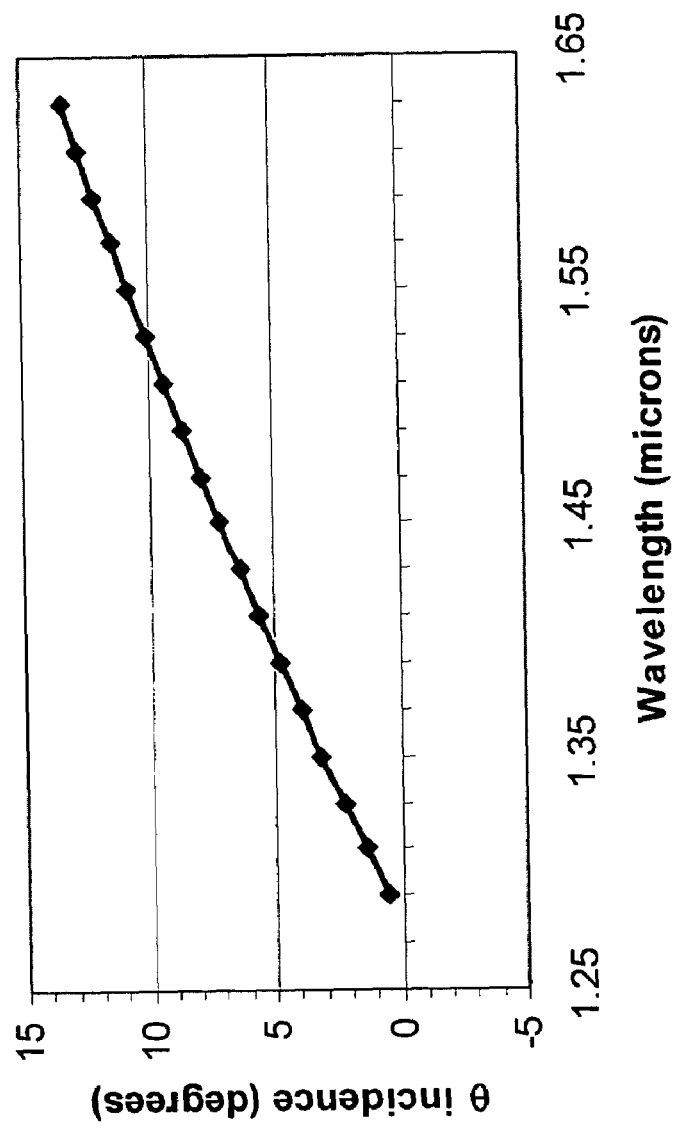
FIG. 5 contains a graph illustrating the desired values of $\theta_{incidence}$ as a function of wavelength for the coupling arrangement of FIG. 1.

FIG. 5 contains a graph illustrating the desired values of $\theta_{incidence}$ as a function of wavelength for an exemplary embodiment of the prism coupler/evanescent coupling layer/thin silicon waveguide arrangement of FIG. 1. Therefore, if these values of $\theta_{incidence}$ can be achieved across the wavelength range of interest, it follows that the desired values of $\theta_{Si}$ can be produced across the wavelength range, significantly reducing the wavelength-dependent loss. From FIG. 5, it can be seen that the desired variation of $\theta_{incidence}$ from 1290 to 1630 nm is on the order of 13°. Over the smaller wavelength range of 1470 to 1610 nm, $\theta_{incidence}$ varies by about 4.85°. Thus, the dispersion $\Delta\theta_{incidence}/\Delta\lambda$ is approximately 0.038°/nm over the full 340 nm range, and over the restricted range the dispersion drops to approximately 0.035°/nm.

In some arrangements, an array of input beams is desired to be used, where the additional beams are parallel to the beam as shown in FIG. 4, and have the same wavelength content and the same angle of incidence. The beams are offset laterally (i.e., into and out of the plane of the paper), with the beam centers separated by a distance that equals or exceeds twice the beam diameter. Since the volume phase gratings can be formed using straightforward wafer-scale processing, two or more different volume phase gratings can be formed and disposed side-by-side to accommodate an array configuration.

Figure 6:
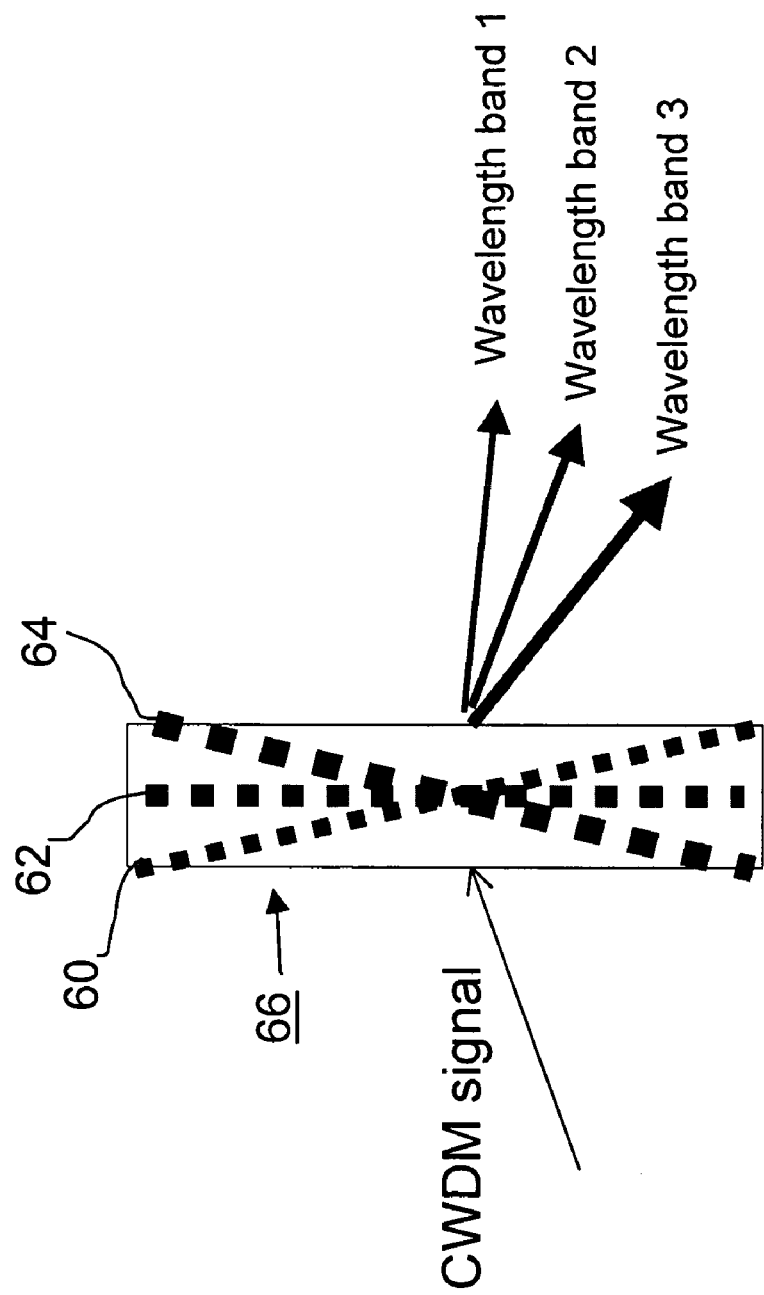
FIG. 6 illustrates an exemplary multiple volume phase grating structure that may be used to provide efficient coupling over a relatively wide bandwidth in accordance with the present invention.

For the CWDM applications as described above, high diffraction efficiencies are required over a relatively wide bandwidth of at least 140 nm, or possible greater. In accordance with the present invention, the need to manipulate these widely-spaced wavelengths is addressed, as illustrated in FIG. 6, by incorporating multiple gratings 60, 62 and 64 in a single element 66. Each grating comprises a different period $\Lambda$ and presents a different angle $\theta_{vpg}$ to the incident beam. By multiplexing a number of separate gratings 60, 62 and 64 in the same volume, it is possible to split an input beam carrying several wavelength sub-bands—all incident at the same angle—into separate beams (with each beam corresponding to one of the wavelength sub-bands) traveling at different angles. As shown in FIG. 6, each separate grating 60, 62 and 64 diffracts a separate CWDM wavelength band, denoted as wavelength bands 1, 2 and 3, with the required incidence angle for each wavelength sub-band achieved by slanting the specific grating that interacts with the specific wavelength sub-band.

A performance consideration associated with the use of an external volume phase grating in association with a prism coupler, as discussed above, is the effect of "walk-off", defined as displacement of the different wavelengths as they propagate along the path between the output of the volume phase grating and the surface of the evanescent coupling layer, where this effect is inherent in the diffractive separation process. This issue is an important concern since the coupling efficiency depends on the position ($\omega_{pcs}$) at which the beam intercepts the evanescent coupling layer relative to terminating edge 34 (as shown in FIG. 2). However, since different wavelengths will intercept the layer at different positions relative to terminating edge 34, it is only possible to optimize the coupling efficiency at the center (or a selected) wavelength within the band.

In accordance with the present invention, therefore, the walk-off may be minimized by using at least one of a number of different techniques, such as utilizing prism/waveguide assemblies that minimize the variation of $\theta_{Si}$ with wavelength, utilizing relatively small prism structures that will therefore minimize walk-off within the prism itself, positioning the volume phase grating close to the prism to minimize the walk-off prior to entering the prism, or incorporating the volume phase grating in a coating layer that is applied to the input facet of the prism.

Figure 7:
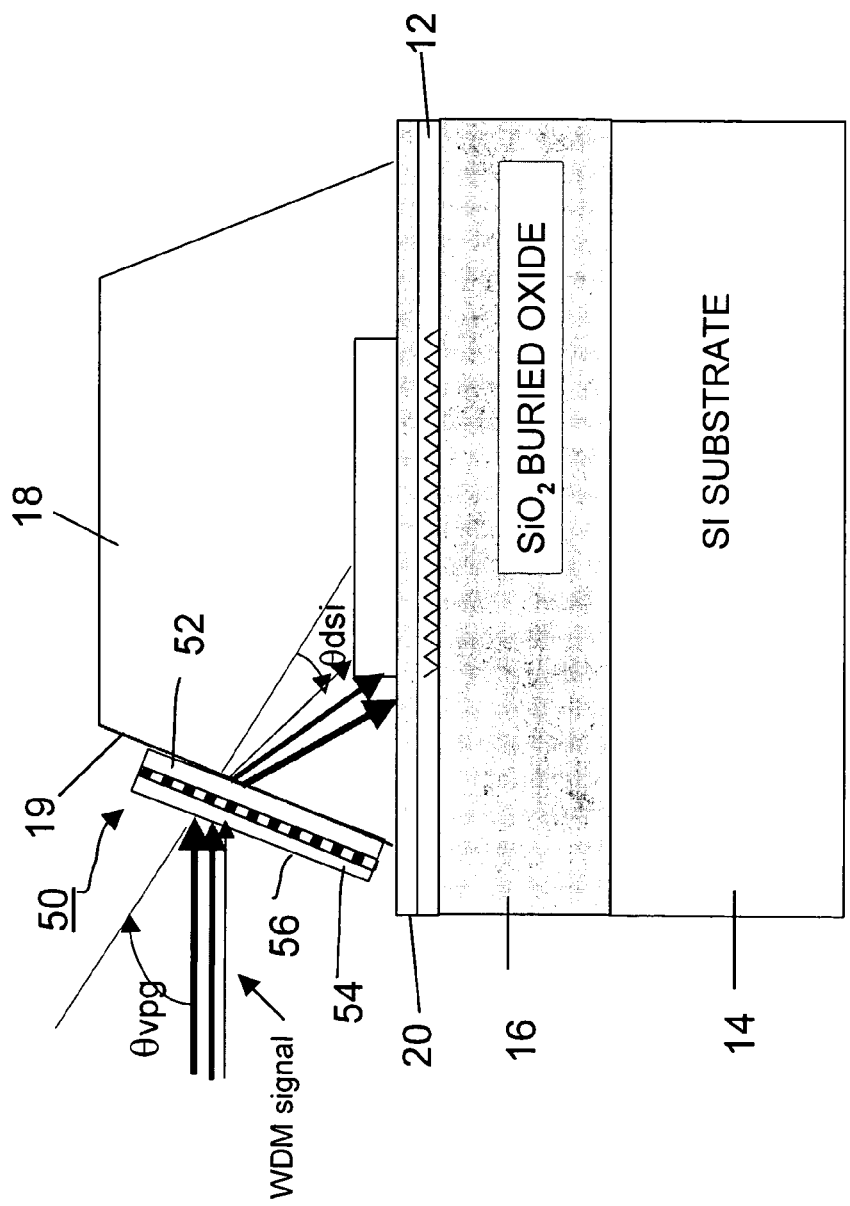
FIG. 7 illustrates a particular embodiment of the present invention where the volume phase grating is directly formed on the coupling facet of the prism coupler to reduce problems associated with walk-off.

FIG. 7 illustrates an exemplary embodiment of the present invention illustrating this last proposed solution to the walk-off problem, where a volume phase grating 50 has been directly formed on input coupling facet 19 of prism coupler 18. In this case, therefore, the diffraction angle $\theta_d$ will also take into account the fact that the signal is being launched into the silicon material of the prism (instead of into "air" between the grating and the prism), where the period of the grating may need to be adjusted accordingly. Volume phase grating 50 is illustrated, in this particular example, as comprising a first layer 52 deposited on facet 19, with a layer of photosensitive material 54 formed over first layer 52 and thereafter exposed to form the desired modulation of the index. An outer coating layer 56 is then formed over the grating structure 54. As an alternative, a surface relief grating structure may be directly etched into prism coupling facet 19, but the performance of such a grating structure has not generally been found to match the diffraction performance of a volume phase grating, such as volume phase grating 50. Additionally, multiplexed phase gratings, such as illustrated in FIG. 6, may also be formed on such a structure disposed on the surface of the input coupling facet.

Although illustrative embodiments of the present invention have been described herein with reference to the accompanying drawings, it is to be understood that the invention is not limited to these precise embodiments, and that various other changes and modifications may be affected therein by one skilled in the art without departing from the scope or spirit thereof.

What is claimed is:

1. An arrangement for providing optical coupling between an external light source generating optical signals at a plurality of different wavelengths and a relatively thin, planar silicon optical waveguide, the arrangement comprising an evanescent coupling layer disposed over at least a portion of the planar silicon optical waveguide, the evanescent coupling layer exhibiting a refractive index less than the refractive index of silicon;

a prism coupling structure disposed over the evanescent coupling layer, the prism coupling structure including at least one coupling facet formed at a predetermined angle with respect to the waveguide surface, the at least one coupling facet for intercepting optical signals within a defined wavelength range, and a prism coupling surface disposed over the evanescent coupling layer; and at least one diffractive optical element including at least one volume phase grating with index modulation fringes slanted with respect to the normal vector associated with the input and output surfaces of the at least one diffractive optical element disposed beyond or on the at least one coupling facet of the prism coupling structure, the at least one diffractive optical element exhibiting a period, modulation index, and grating depth sufficient to modify the launch angle for each different wavelength of operation and improve the coupling efficiency between the prism coupling structure and the relatively thin, planar silicon optical waveguide.

2. The arrangement as defined in claim 1 wherein the evanescent coupling layer is formed to exhibit a thickness profile determined to minimize optical loss over the wavelength range associated with the external light source.

3. The arrangement as defined in claim 1 wherein the at least one coupling facet is an input coupling facet and the at least one volume phase grating diffractive optical element splits the input signal beam into a plurality of separate beams, each beam associated with a separate center wavelength and wavelength range, with the period, modulation index, and grating depth of the at least one volume phase grating diffractive optical element configured such that each beam traverses the prism coupling structure at a different, predetermined launch angle tat minimizes optical coupling loss into the relatively thin, planar silicon optical waveguide.

4. The arrangement as defined in claim 3 wherein the at least one coupling facet further comprises is an output coupling facet and the at least one volume phase grating diffractive optical element redirects the plurality of separate beams propagating through the prism coupling structure to provide beam shaping at the output of the prism coupling structure.

5. The arrangement as defined in claim 1 wherein the plurality of different wavelengths fall within the range of 1.10–1.65 $\mu$m.

6. The arrangement as defined in claim 1 wherein the plurality of different wavelengths comprises a coarse wavelength division multiplexing (CWDM) grid.

7. The arrangement as defined in claim 6 wherein the CWDM grid includes a set of center wavelengths with a spacing of approximately 20 nm between adjacent center wavelengths.

8. The arrangement as defined in claim 1 wherein the plurality of different wavelengths comprises a dense wavelength division multiplexing (DWDM) arrangement with limited spacing between adjacent wavelengths.

9. The arrangement as defined in claim 8 wherein the limited spacing between adjacent wavelengths is less than or equal to 1.6 nm.

10. The arrangement as defined in claim 1 wherein the at least one diffractive optical element comprises a plurality of volume phase gratings, each volume phase grating comprising a structure with a specified period, index modulation and slant angle with respect to the normal vector associated with the input and output surfaces of the diffractive element.

11. The arrangement as defined in claim 10 wherein at least a pair of the plurality of volume phase gratings are superimposed at a single physical location with respect to the prism structure coupling facet.

12. The arrangement as defined in claim 1 wherein the at least one volume phase grating diffractive optical element is formed on the surface of the coupling facet.

* * * * *